US012784041B2

(12) United States Patent
Chen

(10) Patent No.: US 12,784,041 B2
(45) Date of Patent: *Nov. 3, 2026

(54) METHOD AND SYSTEM FOR GENERATING AND READING PAYMENT FILE AND NONTRANSITORY COMPUTER-READABLE STORAGE MEDIUM

(71) Applicant: Jun Chen, Changsha (CN)

(72) Inventor: Jun Chen, Changsha (CN)

(73) Assignee: Jun Chen, Changsha (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/783,351

(22) Filed: Jul. 24, 2024

(65) Prior Publication Data

US 2024/0378602 A1 Nov. 14, 2024

Related U.S. Application Data

(63) Continuation of application No. PCT/CN2023/092626, filed on May 7, 2023.

(30) Foreign Application Priority Data

Mar. 25, 2023 (CN) ........................ 202310299583.1
Oct. 2, 2023 (CN) ........................ 202311276507.5

(51) Int. Cl.
*G06Q 20/38* (2012.01)
*G06Q 20/40* (2012.01)

(52) U.S. Cl.
CPC ....... *G06Q 20/389* (2013.01); *G06Q 20/3829* (2013.01); *G06Q 20/40* (2013.01)

(58) Field of Classification Search
None
See application file for complete search history.

(56) References Cited

U.S. PATENT DOCUMENTS 8,762,270 B1 * 6/2014 Evans .................... G06Q 40/00 455/406
10,764,752 B1 * 9/2020 Avetisov ............. H04L 63/0823
(Continued)

FOREIGN PATENT DOCUMENTS

CA 3102606 A1 * 12/2019 ............. G06Q 20/02
CA 3149808 A1 * 2/2021 ............. G06F 21/35
(Continued)

OTHER PUBLICATIONS

H. R. Hasan and K. Salah, "Proof of Delivery of Digital Assets Using Blockchain and Smart Contracts, " in IEEE Access, vol. 6, pp. 65439-65448, 2018. https://ieeexplore.ieee.org/document/8501910?source=IQplus. (Year: 2018).*
(Continued)

*Primary Examiner* — El Mehdi Oussir

(57) ABSTRACT

The present disclosure provides a method and system for generating and reading a payment file and a non-transitory computer-readable storage medium, and relates to the technical field of Internet payment. The method includes: generating a payment file tag according to a payment attribute, where the payment attribute includes: an issuer blockchain address and a data file price; reading the data file and determining a data content of the payment file according to the payment attribute; and merging the payment file tag and the data content of the payment file to generate a payment file. By inventing the payment file or embedding the payment attribute into the data file, the present disclosure meets a demand of directly issuing digital files to users by a copyright owner.

8 Claims, 5 Drawing Sheets

(56) References Cited

U.S. PATENT DOCUMENTS

| | | | | |
|---|---|---|---|---|
| 10,771,524 | B1 * | 9/2020 | Long | H04L 67/104 |
| 11,188,900 | B2 * | 11/2021 | Arora | G06Q 20/36 |
| 11,836,690 | B1 * | 12/2023 | Stroke | G06Q 20/401 |
| 11,842,317 | B2 * | 12/2023 | Heath | G06Q 10/08355 |
| 11,900,455 | B1 * | 2/2024 | Lawrence | G06Q 40/06 |
| 12,033,120 | B1 * | 7/2024 | Stroke | G06Q 20/0658 |
| 12,047,510 | B2 * | 7/2024 | Ding | H04L 9/3247 |
| 12,121,821 | B2 | 10/2024 | Cella | |
| 12,125,029 | B2 * | 10/2024 | Thorpe | G06Q 20/227 |
| 12,192,388 | B2 * | 1/2025 | Mir | H04L 9/30 |
| 2010/0205078 | A1 * | 8/2010 | Lawrence | G06Q 30/04 705/40 |
| 2013/0041826 | A1 * | 2/2013 | Lang | G06Q 20/04 705/44 |
| 2014/0188717 | A1 * | 7/2014 | Gillman | G06Q 20/02 705/40 |
| 2014/0324687 | A1 * | 10/2014 | Lovelett | G06Q 20/102 705/40 |
| 2016/0012465 | A1 * | 1/2016 | Sharp | G06Q 20/321 705/14.17 |
| 2016/0283920 | A1 * | 9/2016 | Fisher | H04L 9/3239 |
| 2018/0096175 | A1 * | 4/2018 | Schmeling | G06F 1/3206 |
| 2018/0314809 | A1 * | 11/2018 | Mintz | G06F 21/105 |
| 2019/0034926 | A1 * | 1/2019 | Davis | G06Q 20/389 |
| 2019/0296903 | A1 * | 9/2019 | Ramesh | H04L 9/3247 |
| 2019/0386969 | A1 * | 12/2019 | Verzun | G06F 21/606 |
| 2020/0067696 | A1 * | 2/2020 | Sarin | G06F 21/602 |
| 2020/0067907 | A1 * | 2/2020 | Avetisov | H04L 67/133 |
| 2020/0143014 | A1 * | 5/2020 | LeBeau | H04L 9/3236 |
| 2020/0364456 | A1 * | 11/2020 | Tran | G06T 7/0004 |
| 2020/0380520 | A1 * | 12/2020 | Kavali | G06Q 20/4016 |
| 2021/0004858 | A1 * | 1/2021 | Arora | G06Q 30/0225 |
| 2021/0012326 | A1 * | 1/2021 | Maxwell Zelocchi | G06Q 20/3827 |
| 2021/0012332 | A1 * | 1/2021 | Ow | G06Q 20/3678 |
| 2021/0021597 | A1 * | 1/2021 | Salman | H04L 63/0823 |
| 2021/0049600 | A1 * | 2/2021 | Spector | H04L 9/085 |
| 2021/0051013 | A1 * | 2/2021 | Li | G06Q 40/02 |
| 2021/0073212 | A1 * | 3/2021 | Conley | H04L 9/3213 |
| 2021/0117938 | A1 * | 4/2021 | Arora | G06Q 20/3827 |
| 2021/0297418 | A1 * | 9/2021 | Fang | H04L 63/0407 |
| 2021/0319436 | A1 * | 10/2021 | Ow | G06Q 20/0658 |
| 2021/0349770 | A1 * | 11/2021 | Fang | G06F 21/645 |
| 2021/0374693 | A1 * | 12/2021 | La Salle | G06Q 20/0655 |
| 2021/0382620 | A1 * | 12/2021 | Fang | G06Q 10/10 |
| 2022/0020010 | A1 * | 1/2022 | Bai | H04L 9/3236 |
| 2022/0027803 | A1 * | 1/2022 | Irazabal | G06Q 10/0832 |
| 2022/0086187 | A1 * | 3/2022 | LeBeau | H04L 63/062 |
| 2022/0111960 | A1 * | 4/2022 | Tran | B64D 1/18 |
| 2022/0138640 | A1 * | 5/2022 | Augustine | H04L 67/535 705/5 |
| 2022/0179869 | A1 * | 6/2022 | Gaur | G06F 16/2343 |
| 2022/0182443 | A1 * | 6/2022 | Zhang | H04L 67/1048 |
| 2022/0189589 | A1 * | 6/2022 | Ogawa | G16H 50/30 |
| 2022/0198441 | A1 * | 6/2022 | Dalton | G06Q 20/227 |
| 2022/0215389 | A1 * | 7/2022 | Balaraman | H04L 9/30 |
| 2022/0253813 | A1 * | 8/2022 | Pospieszalski | H04L 9/50 |
| 2022/0270002 | A1 * | 8/2022 | Hutchinson | G06Q 10/1095 |
| 2022/0294630 | A1 * | 9/2022 | Collen | H04L 9/3213 |
| 2022/0309491 | A1 * | 9/2022 | Shapiro | G06F 21/64 |
| 2022/0327239 | A1 * | 10/2022 | Macallum | G06F 21/6209 |
| 2022/0335414 | A1 * | 10/2022 | Murray | G06Q 20/3674 |
| 2022/0348363 | A1 * | 11/2022 | Colson | B65B 65/003 |
| 2022/0366486 | A1 * | 11/2022 | Mccoy | H04L 9/3239 |
| 2022/0383417 | A1 * | 12/2022 | Cummings | G06Q 40/06 |
| 2022/0393881 | A1 * | 12/2022 | Ow | G06Q 20/3678 |
| 2022/0398538 | A1 * | 12/2022 | Jakobsson | H04L 9/3213 |
| 2022/0398572 | A1 * | 12/2022 | Lee | G06Q 20/389 |
| 2023/0070586 | A1 * | 3/2023 | Kapur | G06Q 20/123 |
| 2023/0075182 | A1 * | 3/2023 | Galuten | G06Q 20/223 |
| 2023/0086644 | A1 * | 3/2023 | Jakobsson | G06Q 20/367 705/65 |
| 2023/0144857 | A1 * | 5/2023 | Khan | H04L 9/30 713/168 |
| 2023/0229716 | A1 * | 7/2023 | Spangenberg | G06F 16/93 707/769 |
| 2023/0230054 | A1 * | 7/2023 | Livesay | G06Q 20/02 705/39 |
| 2023/0291566 | A1 * | 9/2023 | Shubrook | G06F 21/64 |
| 2023/0291575 | A1 * | 9/2023 | Riva | H04L 63/0823 |
| 2023/0410105 | A1 * | 12/2023 | Gazman | G06Q 20/401 |
| 2023/0419283 | A1 * | 12/2023 | Le | G06Q 30/04 |
| 2024/0127211 | A1 * | 4/2024 | Newton | G06Q 20/065 |
| 2024/0205019 | A1 * | 6/2024 | Chan | G06Q 20/223 |
| 2024/0214194 | A1 * | 6/2024 | Kapur | H04L 9/088 |
| 2024/0354743 | A1 * | 10/2024 | Burgis | G06Q 20/02 |
| 2024/0378600 | A1 * | 11/2024 | Maurya | H04L 9/50 |
| 2024/0378602 | A1 * | 11/2024 | Chen | H04L 9/3247 |
| 2025/0021950 | A1 * | 1/2025 | Stroke | G06Q 20/4015 |
| 2025/0045743 | A1 * | 2/2025 | Huang | G06Q 20/36 |

FOREIGN PATENT DOCUMENTS

| | | | | | |
|---|---|---|---|---|---|
| CA | 3107813 | A1 | * 12/2021 | H04L 67/535 |
| CA | 3181297 | A1 | * 12/2021 | H04W 12/069 |
| CN | 111034114 | A | * 4/2020 | H04L 9/3247 |
| CN | 109584066 | B | * 9/2020 | H04L 9/50 |
| CN | 112035896 | A | * 12/2020 | G06Q 20/4016 |
| CN | 112116461 | A | * 12/2020 | G06Q 20/382 |
| CN | 112231772 | A | * 1/2021 | G06F 21/33 |
| CN | 112232813 | A | * 1/2021 | G06Q 20/3825 |
| CN | 112513853 | A | * 3/2021 | G06F 16/2308 |
| CN | 112654972 | A | * 4/2021 | G06Q 20/02 |
| CN | 112785299 | A | * 5/2021 | G06Q 20/065 |
| CN | 113273146 | A | * 8/2021 | G06F 21/31 |
| CN | 113302610 | A | * 8/2021 | H04L 9/50 |
| CN | 113302612 | A | * 8/2021 | H04L 63/20 |
| CN | 113439281 | A | * 9/2021 | H04L 67/1097 |
| CN | 113491090 | A | * 10/2021 | H04L 63/10 |
| CN | 113592688 | A | * 11/2021 | |
| CN | 107464110 | B | * 12/2021 | G06Q 20/065 |
| CN | 115934659 | A | 4/2023 | |
| CN | 116611919 | A | * 8/2023 | |
| CN | 111260349 | B | * 10/2023 | G06F 21/64 |
| CN | 118355399 | A | * 7/2024 | H04L 9/3247 |
| CN | 119301899 | A | * 1/2025 | H04L 9/3297 |
| CN | 120034343 | A | * 5/2025 | |
| EP | 3701672 | B1 | * 11/2021 | G06Q 20/401 |
| EP | 4395232 | A1 | * 7/2024 | G06Q 20/405 |
| EP | 4010834 | B1 | * 5/2025 | H04L 9/0894 |
| EP | 4064606 | B1 | * 6/2025 | H04L 9/3247 |
| FR | 2806185 | A1 | * 9/2001 | G06Q 20/02 |
| GB | 2578168 | A | * 4/2020 | G06Q 20/3825 |
| JP | 2021529397 | A | * 10/2021 | H04L 9/50 |
| JP | 2023156390 | A | * 10/2023 | H04L 9/3239 |
| JP | 7655940 | B2 | * 4/2025 | G06Q 20/0658 |
| KR | 20210067515 | A | * 11/2019 | |
| KR | 20210093896 | A | * 7/2021 | |
| KR | 20240041916 | A | * 7/2022 | |
| KR | 20240048636 | A | * 10/2022 | |
| KR | 20230039519 | A | * 3/2023 | |
| KR | 20240034793 | A | * 3/2024 | H04L 9/3247 |
| WO | WO-2019125439 | A1 | * 6/2019 | B33Y 50/02 |
| WO | WO-2019125666 | A1 | * 6/2019 | G06Q 20/02 |
| WO | WO-2020014399 | A1 | * 1/2020 | G06F 21/606 |
| WO | WO-2020022958 | A1 | * 1/2020 | H04L 9/3247 |
| WO | WO-2020041746 | A1 | * 2/2020 | G06F 21/602 |
| WO | WO-2020147568 | A1 | * 7/2020 | G06F 21/64 |
| WO | WO-2021072417 | A1 | * 4/2021 | G06Q 20/223 |
| WO | WO-2021127575 | A1 | * 6/2021 | H04W 12/069 |
| WO | WO-2021165754 | A1 | * 8/2021 | G06F 21/64 |
| WO | WO-2021184975 | A1 | * 9/2021 | G06F 21/602 |
| WO | WO-2021210918 | A1 | * 10/2021 | H04L 9/50 |
| WO | WO-2022021997 | A1 | * 2/2022 | H04L 41/0823 |
| WO | WO-2022046322 | A1 | * 3/2022 | G06Q 20/02 |
| WO | WO-2022124291 | A1 | * 6/2022 | G06Q 20/02 |
| WO | WO-2022159519 | A1 | * 7/2022 | G06F 16/1837 |
| WO | WO-2023287969 | A1 | * 1/2023 | A63F 13/35 |
| WO | WO-2023023137 | A1 | * 2/2023 | G06Q 20/02 |
| WO | WO-2023034755 | A1 | * 3/2023 | G06F 21/62 |
| WO | WO-2023068609 | A1 | * 4/2023 | G06Q 20/401 |
| WO | WO-2023114048 | A1 | * 6/2023 | G06Q 20/02 |
| WO | WO-2023122182 | A1 | * 6/2023 | H04L 9/3297 |

(56) References Cited

FOREIGN PATENT DOCUMENTS

| | | | | | |
|---|---|---|---|---|---|
| WO | WO-2023212204 | A1 | * | 11/2023 | ........... G06Q 30/018 |
| WO | WO-2024054665 | A1 | * | 3/2024 | ........... H04L 9/3247 |
| WO | WO-2024220312 | A1 | * | 10/2024 | ......... G06Q 20/3674 |

OTHER PUBLICATIONS

A. Kaushik and M. Malik, "Securing the transfer and controlling the piracy of digital files using Blockchain," 2022 Fifth International Conference on Computational Intelligence and Communication Technologies (CCICT), Sonepat, India, 2022 https://ieeexplore.ieee.org/document/9913594?source=IQplus (Year: 2022).*

M. M. Islam and H. P. In, "Decentralized Global Copyright System Based on Consortium Blockchain With Proof of Authority," in IEEE Access, vol. 11, pp. 43101-43115, 2023. https://ieeexplore.ieee.org/document/10109089?source=IQplus (Year: 2023).*

B. Groza, T. Andreica, A. Berdich, P.-S. Murvay and E. H. Gurban, "PRESTvO: PRivacy Enabled Smartphone Based Access to Vehicle On-Board Units," in IEEE Access, vol. 8. https://ieeexplore.ieee.org/document/9121223?source=IQplus (Year: 2020).*

H. R. Hasan and K. Salah, "Proof of Delivery of Digital Assets Using Blockchain and Smart Contracts, " in IEEE Access, vol. 6, pp. 65439-65448, 2018, doi: 10.1109/ACCESS.2018.2876971. https://ieeexplore.ieee.org/document/8501910?source=IQplus (Year: 2018).*

A. Kaushik and M. Malik, "Securing the transfer and controlling the piracy of digital files using Blockchain," 2022 Fifth International Conference on Computational Intelligence and Communication Technologies, Sonepat, India, 2022, pp. 324-331. https://ieeexplore.ieee.org/document/9913594?source=IQplus (Year: 2022).*

Z. Ullah, B. Raza, H. Shah, S. Khan and A. Waheed, "Towards Blockchain-Based Secure Storage and Trusted Data Sharing Scheme for IoT Environment," in IEEE Access, vol. 10, pp. 36978-36994, 2022. https://ieeexplore.ieee.org/document/9745976? source=IQplus (Year: 2022).*

* cited by examiner

METHOD AND SYSTEM FOR GENERATING AND READING PAYMENT FILE AND NONTRANSITORY COMPUTER-READABLE STORAGE MEDIUM

TECHNICAL FIELD

The present disclosure relates to the technical field of Internet payment, and particularly, to a method and system for generating and reading a payment file and a non-transitory computer-readable storage medium.

BACKGROUND

In the current copyright system, copyright owners of digital files have several basic exclusive rights to control the development and utilization of their digital file works, including: (1) right of reproduction; (2) right of deduction; (3) right of distribution; (4) right of performance; (5) right of exhibition; (6) right of performance for digital audio transmission of sound recordings.

Because many links are involved in the copyright distribution of digital files, the distribution efficiency is low, which also brings many coordination problems to the copyright supervision department. For example, it is difficult to know at the first time who is the issuing institution corresponding to the copyrighted digital file. In the existing system, it is also difficult for users to know who is the genuine publisher of digital files, such that the channels for genuine distribution of digital files are limited.

SUMMARY

It is found by the inventor that in the existing digital file distribution system, it is difficult to effectively guarantee the interests of copyright owners, and it is also difficult for users to use genuine copies. There is an urgent need for a method to generate and read a payment file, and use blockchain payment methods to directly connect copyright owners and end users, creating another fast channel for the genuine distribution of digital files.

In order to overcome the shortcomings in the existing technology that the copyright owners cannot quickly set payment attribute and instantly issue data files by nesting and integrating payment files, and that users cannot know the copyright owners for copyright payment through the data files, the patent of the present disclosure provides a method and system for generating and reading a payment file to solve the problems in the background art.

In order to achieve the above objects, the present disclosure is implemented through the following technical solutions:

A method for generating and reading a payment file, used for a generation device, where the method is executed by a processor for the generation device, the method including:

generating a payment file tag according to a payment attribute, the payment attribute including: an issuer blockchain address and a payment file price, where the payment attribute is used by the reading device to determine an operating authority for the payment file by reading a transaction record of the issuer blockchain address to operate the payment file;

reading the data file and determining a data content of the payment file according to the payment attribute; and merging the payment file tag and the data content of the payment file to generate the payment file.

Further, the generating the payment file tag according to the payment attribute, and the reading the data file and determining the data content of the payment file according to the payment attribute include:

reading the payment file, the payment file including: the data content of the payment file, and the payment file tag;

determining the data content of the payment file according to the payment attribute and the data file, where when a quantity unit that is not less than the payment file price is received in the issuer blockchain address, the data file is capable of being determined from the data content of the payment file, the payment attribute including: a payment file type, the issuer blockchain address, and the payment file price;

calculating a check code of the data content of the payment file, the check code of the data content of the payment file being a digital feature identifier of the data content of the payment file calculated through a one-way function;

generating a blockchain signature message of the issuer blockchain address according to the issuer blockchain address and the check code of the data content of the payment file; and generating a payment file tag is according to the payment attribute, the check code of the data content of the payment file, and the blockchain signature message.

Further, the payment attribute further includes: a product attribute, the product attribute including an origin, a producer, a purpose, performance, a specification, a grade, main ingredients, a production date, a validity period, an inspection certificate, an instruction for use, an after-sales service of the data file, or a content, a specification, and a cost of the service.

A method for generating and reading a payment file, used for a reading device, where the method is executed by a processor for the reading device, the method including:

reading the payment file, the payment file including: the data content of the payment file, and the payment file tag;

obtaining the payment attribute according to the payment file tag, the payment attribute including: the issuer blockchain address and the payment file price;

obtaining the transaction record between a client blockchain address and the issuer blockchain address; and determining the operation authority for the payment file according to the transaction record and the payment attribute, and operating the payment file according to the operation authority.

Further, the obtaining the transaction record between the client blockchain address and the issuer blockchain address, the determining the operation authority for the payment file according to the transaction record and the payment attribute, and operating the payment file according to the operation authority include:

the data content of the payment file including a data file, and the payment file tag including the payment attribute, the check code of the data content of the payment file, and the blockchain signature message, where the payment attribute includes: the payment file type, the issuer blockchain address, and the payment file price, where the check code of the data content of the payment file is a digital feature identifier that calculates the data content of the payment file through the one-way function, and the blockchain signature message is generated by the issuer blockchain address through the blockchain signature according to the check code of the data content of the payment file;

verifying whether the data content of the payment file matches the check code of the data content of the payment file;

verifying whether the blockchain signature message is the issuer blockchain address signature according to the issuer blockchain address, the check code of the data content of the payment file, and the blockchain signature message in response to the data content of the payment file matching the check code of the data content of the payment file;

obtaining the transaction record between the client-associated blockchain address and the issuer blockchain address in response to the blockchain signature message being the issuer blockchain address signature upon receiving a unit of account that is not less than the payment file price and sent from the client-associated blockchain address in the issuer blockchain address; and determining the operation strategy for the payment file according to the transaction record and the payment attribute, where the data file is capable of being determined from the data content of the payment file, and operating the payment file according to the operation strategy.

Further, the determining the operation authority for the payment file according to the transaction record and the payment attribute and the operating the payment file according to the operation authority include:

determining whether the data content of the payment file is capable of being extracted from the payment file according to the transaction record; and extracting the data content of the payment file and saving the data content of the payment file as the data file in response to the data content of the payment file being capable of being extracted.

Further, the determining the operation authority for the payment file according to the transaction record and the payment attribute and operating the payment file according to the operation authority include:

determining whether the payment file is authorized to be run from a current system according to the transaction record; and generating an authorization record for a local system according to the transaction record in response to the payment file having been authorized to be run from the current system, where when next time the payment file is run, the payment file is capable of being run directly in an authorized manner according to the authorization record.

Further, the method further includes:

the payment attribute further including: a blockchain address of the data file, and a private key of the blockchain address of the data file;

the client blockchain address being the blockchain address of the data file;

paying the payment file price to the blockchain address of the data file; and transferring a balance of the payment file price from the blockchain address of the data file to the issuer blockchain address according to the private key of the blockchain address of the data file.

Further, the extracting the data content of the payment file and saving the data content of the payment file as the data file includes:

the payment attribute further including: an encryption algorithm identifier of the data file;

decrypting the data content of the payment file according to the payment attribute and the encryption algorithm identifier of the data file; and saving the decrypted data content of the payment file as the data file.

Further, the obtaining the transaction record between the client blockchain address and the issuer blockchain address includes:

the payment attribute further including: an issuer share, a rights owner blockchain address, and the rights owner share; and obtaining the transaction records among the client blockchain address, the issuer blockchain address, and the rights owner blockchain address.

Further, the method further includes:

paying the price of the payment file to the issuer blockchain address according to the issuer share, and to the rights blockchain address according to the right owner share.

Further, the method further includes:

the payment attribute further including: a random code, the random code being configured to generate a TOTP secret key; and obtaining a TOTP dynamic check code, and verifying whether a right to access the data content of the payment file is existing according to the TOTP dynamic check code and the random code.

Further, the obtaining the transaction record between the client-associated blockchain address and the issuer blockchain address includes:

Obtaining a balance of the client-associated blockchain address;

transferring an accounting amount of the payment file price from the client-associated blockchain address to the issuer blockchain address in response to the balance being greater than the payment file price; and obtaining a number of transaction confirmations between the client-associated blockchain address and the issuer blockchain address.

Further, the obtaining the transaction record between the client-associated blockchain address and the issuer blockchain address upon receiving the unit of account that is not less than the payment file price from the client-associated blockchain address in the issuer blockchain address includes:

the payment attribute further including: the issuer share, the rights owner blockchain address, and the rights owner share; and obtaining the transaction records among the client-associated blockchain address, the issuer blockchain address, and the rights owner blockchain address upon receiving the unit of account that is sent from the client-associated blockchain address, not less than the payment file price, and calculated respectively according to the issuer share and the rights owner share in the issuer blockchain address and the rights owner blockchain address.

Further, the determining the operation strategy of the payment file according to the transaction record and the payment attribute so as to determine the data file from the data content of the payment file, and the operating the payment file according to the operation strategy includes: obtaining the data file from the data content of the payment file according to the operation strategy when the unit of account that is sent from the client-associated blockchain address, not less than the payment file price, and calculated respectively according to the issuer share and the rights owner share received in the issuer blockchain address and the rights owner blockchain address is judged.

A non-transitory computer-readable storage medium has a computer program stored therein, where when executed by a processor, the computer program implements steps of the method for generating and reading a payment file as described herein.

The beneficial effects of the present disclosure are as follows: according to the present disclosure, the payment file tag according to payment attribute is generated, including the issuer blockchain address and the data file price, and the data file is read and the data content of the payment file is determined according to the payment attribute; and the payment file tag and the data content of the payment file are merged to generate the payment file. By inventing the payment file or embedding the payment attribute in the data file, the present disclosure meets the needs of copyright owners to directly issue digital files to end users.

Compared with the traditional bank card payment and two-dimensional code payment methods, a new many-to-one and many-to-many payment file payment method is provided herein. The present disclosure greatly improves the convenience for the copyright owners to distribute copyright files, and the users can pay fees and obtain the data content of the payment file anytime and anywhere. The copyright owners can quickly distribute the files through a payment file network disk, a compressed file, a payment file password, etc.

According to the present disclosure, the data content of the payment file is determined according to the payment attribute and the data file, the data content check code of the payment file is calculated, the blockchain signature message is generated according to the issuer blockchain address and the data content check code of the payment file, the payment file tag is generated according to the payment attribute, the data content check code of the payment file, and the blockchain signature message, and the payment file tag and the data content of the payment file are merged to generate the payment file. By inventing the payment file and supporting dual verification technologies such as the data content check code of the payment file and the blockchain signature message, the present disclosure can effectively verify the issuer's ownership of the data file and further ensure that the data file is temper-proof, thereby improving the consumption experience of the users on the direct-release digital files.

In the present disclosure, the payment file is read, and the payment file includes: the data content of the payment file and the payment file tag; whether the blockchain signature message is the issuer blockchain address signature according to the issuer blockchain address, the check code of the data content of the payment file, and the blockchain signature message is verified in response to the data content of the payment file matching the check code of the data content of the payment file, and the operation on the payment file is determined according to the transaction record and the payment attribute upon receiving the unit of account that is sent from the client-associated blockchain address and not less than the payment file price from the issuer blockchain address. The present disclosure solves the problem of users' trust in the source of payment file through the blockchain double verification technology, and improves the consumption experience of the users on the directly issued payment files.

DETAILED DESCRIPTION

The present disclosure will be further described below in conjunction with the accompanying drawings and examples.

Embodiment 1

Figure 1:
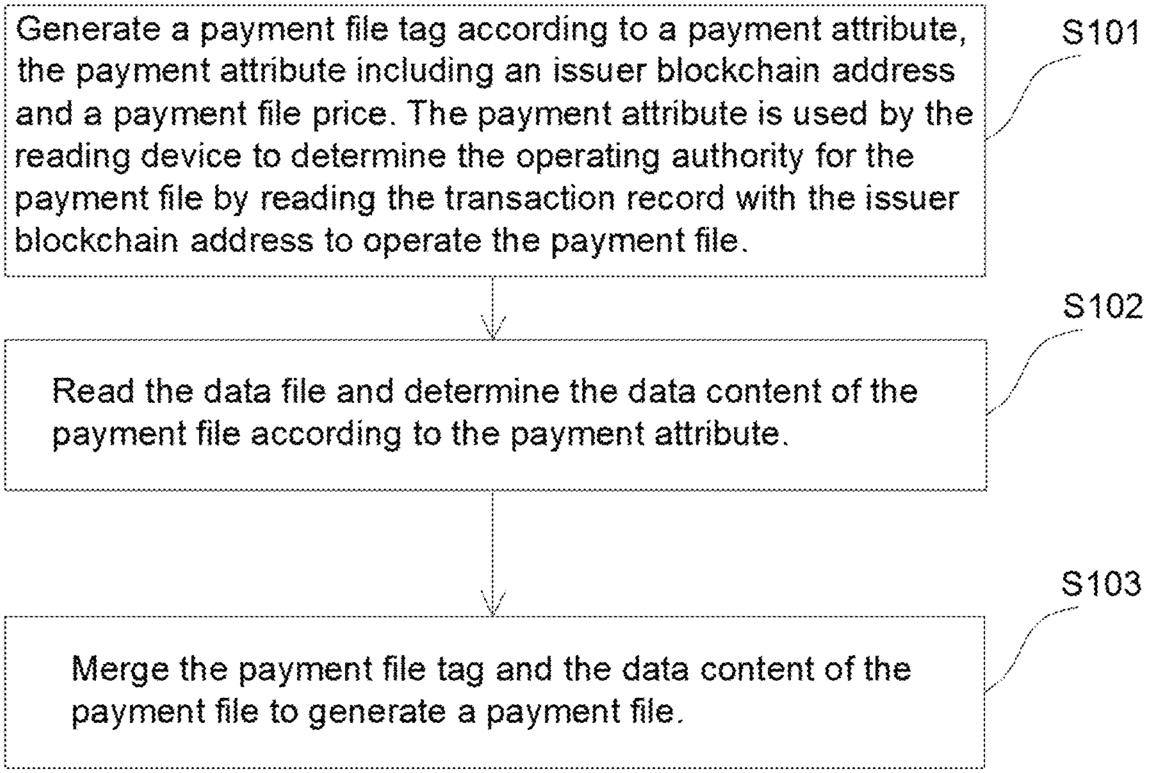
FIG. 1 is a flow chart of an embodiment 1 of the present disclosure.

Embodiment 1 of the present disclosure discloses a method for generating and reading a payment file. Referring to FIG. 1, it is used for a generation device. The method includes:

Step S101: A payment file tag is generated according to a payment attribute, the payment attribute including an issuer blockchain address and a payment file price. The payment attribute is used by the reading device to determine the operating authority for the payment file by reading the transaction record with the issuer blockchain address to operate the payment file. The blockchain can be a block DAG technology, etc., and the payment file price is calculated according to a local digital legal currency. For those not need to exchange legal currency, they can be blockchain points or blockchain assets.

Step S102: The data file is read and the data content of the payment file is determined according to the payment attribute.

Step S103: The payment file tag and the data content of the payment file are merged to generate a payment file.

The payment file can include an XML file, a JSON file, a binary file, a text file, an Office file, a network disk link file and other formats.

There are two ways to synthesize the payment file. I, an issuer packages the digital file provided by a copyright owner, adds some payment file tags, and combine them into a payment file; and II, the copyright owner directly modifies or adds the payment attribute to the label in the digital file. When the copyright owner actually issues the digital file, he/she can use these two methods to issue the digital file at the same time. That is, according to the existing payment attribute, the issuer will package the digital file into the payment file to maximize the impact of the digital file.

The payment file can be a completely new type of files, such as the 1234.mp3.pay file with the suffix. Pay, or it can be the data file 123.mp3 after modifying the payment file label. For an mp3 music file, it can be set in a TAG tag such as Ownership frame and WPAY Payment tags.

Further, the payment attribute further includes: a blockchain address of the data file, a private key of the blockchain address of the data file.

For the copyright owner, different payment attribute can be set to distinguish different payment scenarios, for example, monthly payment, pay-per-view billing, billing based on duration, etc. The issuer blockchain address and payment file price will be different. There are also some digital files that can have blockchain address of the data files prepared in advance and have a certain amount of trial balance. The user can pay for the trial when receiving the payment file. Alternatively, the copyright owner can use the blockchain address of the data file to track the distribution scope of the digital file. When the digital file is an application, the blockchain address of the data file can be used as the authorized identity when the application is running.

Further, the payment attribute further includes: a payment file check website, a payment file check code, and a payment file check server website. The payment file check server website is configured to encrypt and decrypt the data content of the payment file.

Further, the payment attribute further includes: an issuer share, a rights owner blockchain address, and a rights owner share. The rights owner blockchain address can be multiple authors of the payment file, and can also include the owner of the company, the owner of the patent rights involved in the data content of the payment file, and other related personnel. These people generally have an agreement with the issuer or the copyright owner. It is determined in the payment file with the payment attribute share.

By setting payment shares and other technical means, this embodiment has invented a new many-to-many payment file payment method.

Further, the method reads the data file and determines the data content of the payment file according to the payment attribute, including:

The payment attribute further includes: a data file encryption algorithm identifier;

The data file is read to determine the content of the data file; and

The data file content is encrypted according to the payment attribute and the data file encryption algorithm identifier to obtain the data content of the payment file.

Embodiment 2

Figure 2:
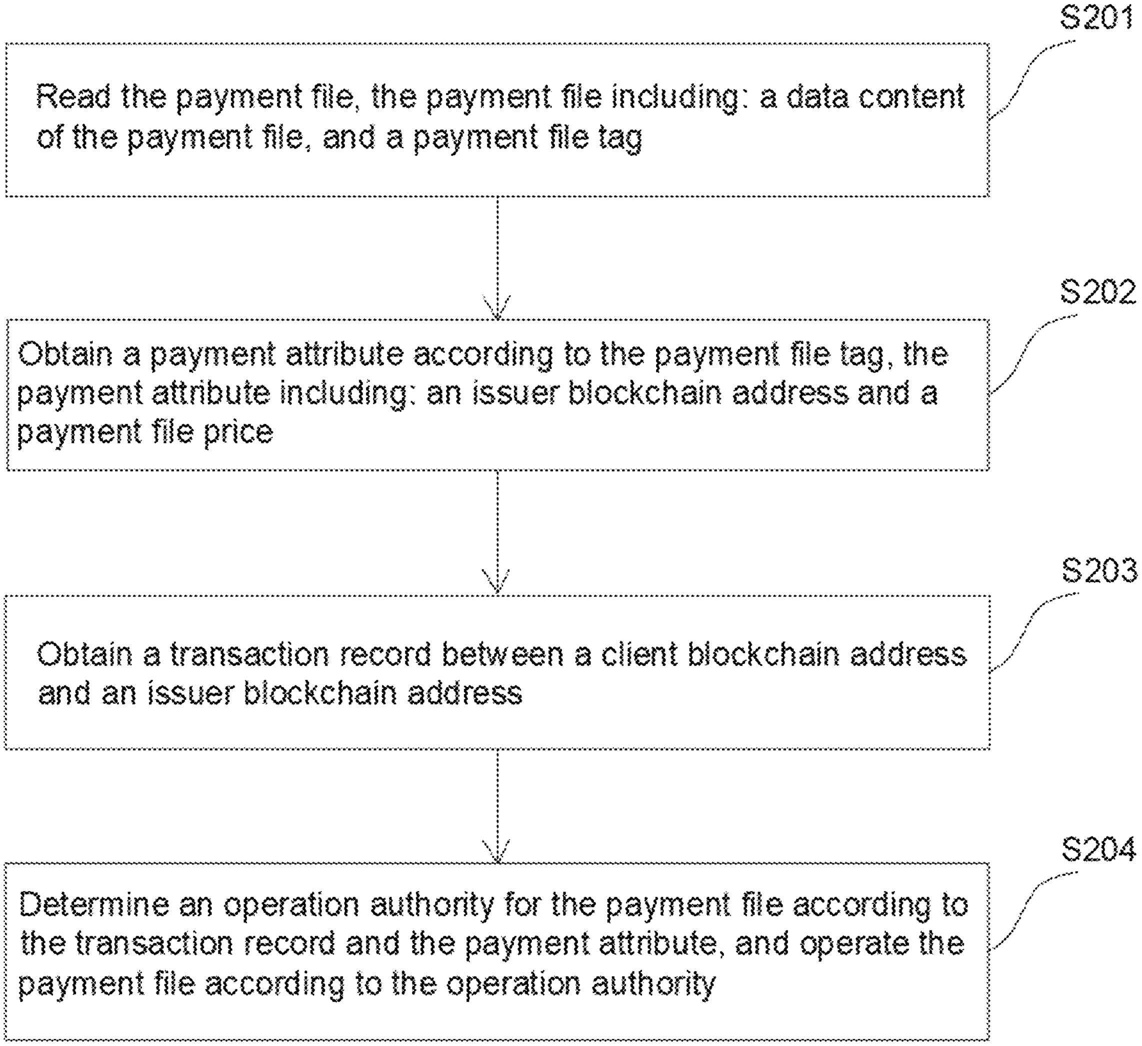
FIG. 2 is a flow chart of an embodiment 2 of the present disclosure.

Embodiment 2 of the present disclosure discloses a method for generating and reading a payment file. Referring to FIG. 2, it is used for a reading device. The method includes:

Step S201: The payment file is read, the payment file including: a data content of the payment file, and a payment file tag.

Step S202: A payment attribute is obtained according to the payment file tag, the payment attribute including: an issuer blockchain address and a payment file price.

Step S203: A transaction record between a client blockchain address and an issuer blockchain address is obtained, where the client blockchain address can be the blockchain address of the data file, the blockchain address of the reading device, or the client blockchain address that the user has logged in and can connect to, such as a blockchain address of an mp3 player terminal.

Step S204: An operation authority for the payment file is determined according to the transaction record and the payment attribute, and the payment file is operated according to the operation authority.

For the MP3 file with the embedded payment attribute, a typical process is as follows:

1. A blockchain payment attribute tag of the mP3 file is read.
2. The logged-in blockchain payment address of the playback terminal of the reading device is read.
3. Whether there is a transaction record and the transaction record amount is greater than the legal payment amount is inquired.
4. A playback terminal of the reading device is allowed to play the file and the mp3 file is played.

Further, the determining the operating authority for the payment file according to the transaction record and the payment attribute, and the operating the payment file according to the operating authority include:

Whether the data content of the payment file is capable of being extracted from the payment file is judged according to the transaction record; and The data content of the payment file is extracted and the data content of the payment file is saved as the data file in response to the data content of the payment file being capable of being extracted. Typically, the data content is extracted from “1234.mp3.pay” and saved as the file “1234.mp3”.

Through this embodiment, it is possible to simply add payment tags and encapsulation to various existing files to distribute digital file copyrights, without making any changes to the existing system after payment is made during use.

Further, the determining the operating authority for the payment file according to the transaction record and the payment attribute, and the operating the payment file according to the operating authority include:

The payment file is a multimedia file;

Whether the payment file can be played is judged according to the transaction record; and If the payment file can be played, then the payment file is played.

Typically, the multimedia file is an mp3 audio file.

Further, the determining the operating authority for the payment file according to the transaction record and the payment attribute, and the operating the payment file according to the operating authority include:

The payment file is a compressed file;

Whether the payment file can be decompressed is judged according to the transaction record; and If the payment file can be decompressed, then the payment file is decompressed.

Typically, the compressed file is rar file, a zip file, and etc.

Further, the determining the operating authority for the payment file according to the transaction record and the payment attribute, and the operating the payment file according to the operating authority include:

Whether the payment file is authorized to be run from the current system is judged according to the transaction record; and An authorization record for the local system is generated according to the transaction record in response to the payment file having been authorized to be run from the current system, such that the next time the payment file is run, it can be run directly in an authorized manner according to the authorization record.

Since blockchain transaction record is temper-proof and traceable, it is more suitable for software copyright authorization scenarios. In a typical scenario, after payment, a device registration code needs to be submitted to the payment file verification server or software registration server to control the distribution scope of the software.

Further, the method further includes:

The payment attribute further includes: a blockchain address of the data file, a private key of the blockchain address of the data file;

The client blockchain address is the blockchain address of the data file;

The payment file price is paid to the blockchain address of the data file; and

The balance of the payment file price is transferred from the blockchain address of the data file to the issuer blockchain address according to the private key of the blockchain address of the data file.

In a typical scenario, the issuer issues the payment file to a software download platform and needs to provide a trial account with the blockchain address of the data file for the platform to use.

Further, the payment attribute further includes: a payment file verification website, a check code of the payment file, and a payment file check server website. The payment file check server website is configured to encrypt and decrypt the data content of the payment file. The user can verify the payment file at any time to confirm that the received file is a genuine one.

Further, the method further includes:

The payment attribute further including: a data file encryption algorithm identifier;

The data content of the payment file is decrypted according to the payment attribute and the data file encryption algorithm identifier; and The decrypted data content of the payment file is saved as the data file.

When the data file is not an executable program, the copyright owner or issuer can encrypt the data file in the payment file to protect its copyright income. The user needs to decrypt it when reading. The data file encryption algorithm identifier of the reading device may include some non-public keys for decryption, corresponding to the generation device, to prevent being cracked.

Further, the obtaining the transaction record between the client blockchain address and the issuer blockchain address includes:

The payment attribute further includes: an issuer share, a rights owner blockchain address, and a rights owner share; and Transaction records among the client blockchain address, the issuer blockchain address, and the rights owner blockchain address are obtained.

Further, the method further includes:

The payment file price is paid to the issuer blockchain address according to the issuer share, and is paid to the rights blockchain address according to the right owner share. It is assumed that there are 3 rights owners for 1234.mp3, the payment file price is 1 yuan, the issuer share is 30%, the composer share is 20%, and the lead singer share is 50%. The user pays 1 yuan, which will be split into 3 transaction orders, paying 0.3 yuan to the issuer blockchain address, 0.2 yuan to the composer blockchain address, and 0.5 yuan to the lead singer blockchain address.

Through the above embodiments, the copyright owner or issuer can determine the shares owned by the data file issuer, copyright owner, patentee, etc. when issuing the payment file, automatically collect payments, reduce mutual settlement processes, circulate efficiently, and improve the efficiency of knowledge creation.

Embodiment 3

Embodiment 3 of the present disclosure discloses a system for generating and reading a payment file, used for a generation device. The generation device includes: a payment file tag unit, a data content unit of the payment file, a payment file unit; the payment file tag unit, the data content unit of the payment file and the payment file unit are logically connected to each other.

The payment file tag unit is configured to generate a payment file label according to a payment attribute, the payment attribute including: an issuer blockchain address and a data file price, and the payment attribute is used by a reading device to determine the operating authority for the payment file by reading the transaction record of the issuer blockchain address to operate the payment file.

The data content unit of the payment file is configured to read the data file and determine the data content of the payment file according to the payment attribute.

The payment file unit is configured to merge the payment file tag and the data content of the payment file to generate a payment file.

The payment file generated by this embodiment can be freely moved, transmitted, and then read on a host equipped with the reading device. This means that the key point of copyright management is no longer the data transmission part, but the right of distribution of the issuing end and the right of reproduction of a tail end. Through the present disclosure, third-party websites can publish any payment files produced by the copyright owner without obtaining authorization. This brings great convenience to users to search for digital file resources and the copyright owners to publish and distribute files, thereby creating a good atmosphere and environment for knowledge workers engaged with knowledge creation work.

Embodiment 4

Embodiment 4 of the present disclosure discloses a system for generating and reading a payment file, used for a reading device. The reading device includes: a payment file tag unit, a transaction recording unit, and an operating unit; the payment file tag unit, the transaction recording unit, and the operating unit are logically connected to each other;

The payment file tag unit is configured to read the payment file to obtain a payment attribute, the payment attribute including: an issuer blockchain address and a data file price;

The transaction recording unit is configured to obtain a transaction record between a client blockchain address and the issuer blockchain address; and The operating unit is configured to determine the operating authority for the payment file according to the transaction record and the payment attribute, and to operate the payment file according to the operating authority.

The reading device of this embodiment can read the payment file, analyze the operation permissions contained in the payment file according to the payment attribute, and further make payment as needed. This will enable easy distribution of copyright documents. Due to the inability to achieve interconnection through traditional payment methods, the payment effect achieved by such payment file cannot be achieved.

Embodiment 5

Embodiment 5 of the present disclosure discloses a non-transitory computer-readable storage medium, having a computer program stored therein. When executed by a processor, the computer program implements the steps of the method of the above embodiment. The storage medium can include a high-speed random access storage medium, and can also include a non-volatile storage medium, such as a hard drive, a memory, a plug-in hard drive, a smart memory card (SMC), and a secure digital (SD) card, a flash card, at least one disk storage medium, a flash memory device, or other volatile solid-state storage medium, etc.

In the present disclosure, the payment file tag is generated according to the payment attribute, including: the issuer blockchain address and the data file price, reads the data file and determines the data content of the payment file according to the payment attribute, and the payment file tag and the data content of the payment file are merged to generate a payment file. By inventing the payment file or embedding the payment attribute in data file, the present disclosure meets the needs of copyright owners to directly issue digital files to end users.

Those skilled in the art can clearly understand that for the convenience and simplicity of description, the above-described units are only exemplified by the division of the above-mentioned functional modules. In actual applications, the above-mentioned functions can be allocated to different modules according to needs. Functional modules are completed, that is, the internal structure of the device is divided into different functional modules to complete all or part of the functions described above. For the specific working processes of the systems, devices, and units described above, reference can be made to the corresponding processes in the foregoing method embodiments, and details will not be described again here.

In the several embodiments provided in this application, it should be appreciated that the disclosed systems, devices, and methods can be implemented in other ways. For example, the device embodiments described above are only illustrative. For example, the division of modules or units is only a logical function division. In actual implementation, there may be other division methods, for example, multiple units or components may either be combined with or integrated into another system, or some features can be ignored, or not implemented. On the other hand, the coupling or direct coupling or communication connection between each other shown or discussed may be through some interfaces, and the indirect coupling or communication connection of the devices or units may be in electrical, mechanical or other forms.

The units described as separate components may or may not be physically separated, and the components shown as units may or may not be physical units, that is, they may be located in one place, or they may be distributed to multiple network units. Some or all of the units can be selected according to actual needs to achieve the purpose of the solution of this embodiment.

In addition, each functional unit in various embodiments of the present disclosure can be integrated into one processing unit, or each unit can exist physically alone, or two or more units can be integrated into one unit. The above integrated units can be implemented in the form of hardware or software functional units.

If the integrated unit is implemented in the form of a software functional unit and sold or used as an independent product, it may be stored in a computer-readable storage medium. Based on this understanding, essentially, the technical solution of the present disclosure or part of the technical solution contributing to the existing technology or all or part of the technical solution can be embodied in the form of a software product, and the computer software product is stored in a storage medium, including several instructions to cause a computer device (which may be a personal computer, a server, or a network device, etc.) or a processor to execute all or part of the steps of the methods described in various embodiments of the present disclosure. The above-mentioned storage medium includes: a U disk, a mobile hard disk, a read-only memory (ROM), a random access memory (RAM), a magnetic disk or an optical disk and other media that can store a program code.

Embodiment 6

Figure 3:
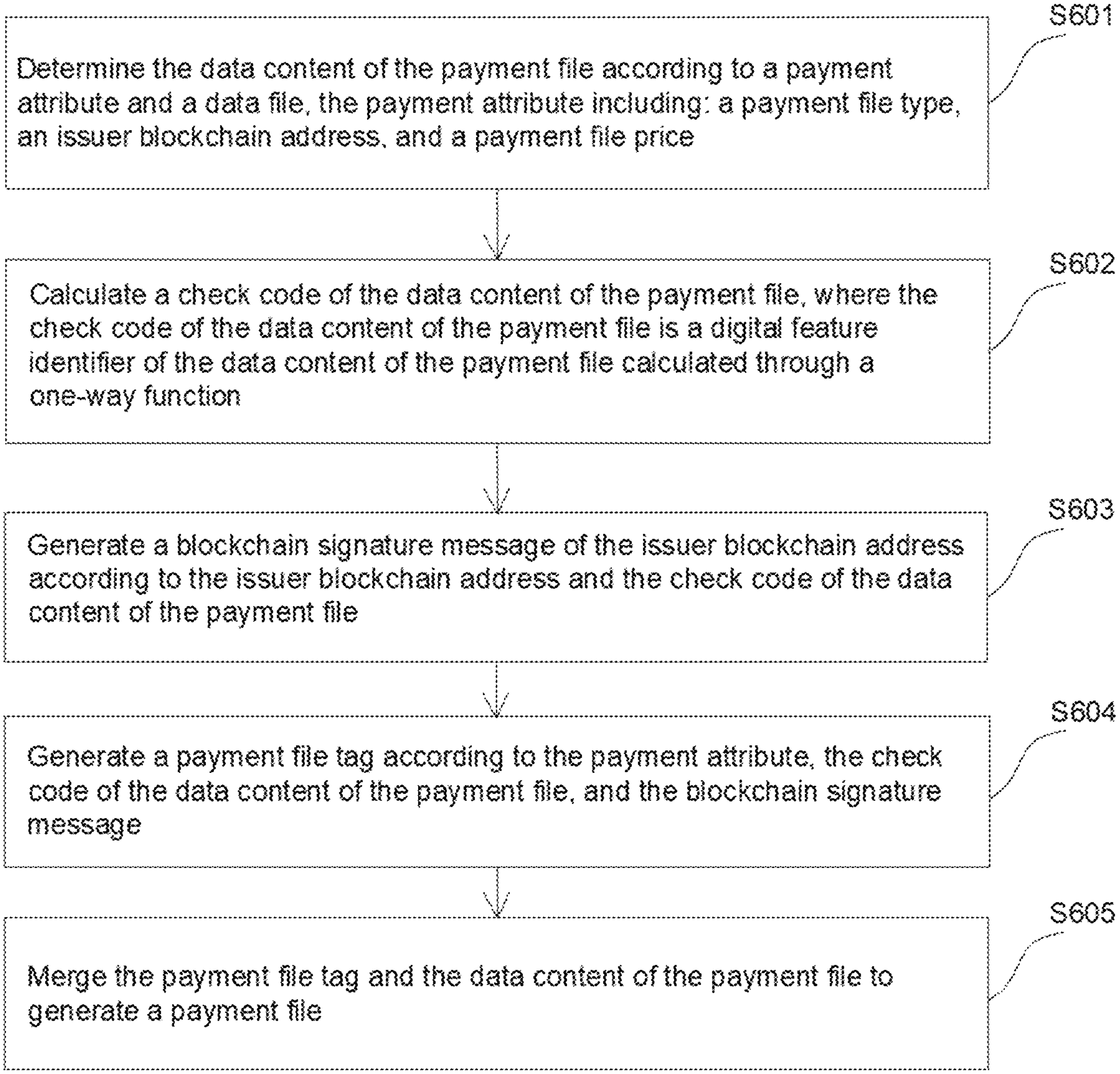
FIG. 3 is a flow chart of an embodiment 6 of the present disclosure.

Embodiment 6 of the present disclosure discloses a method for generating and reading a payment file. Referring to FIG. 3, it is used for a generation device. The method includes:

Step S601: The data content of the payment file is determined according to a payment attribute and a data file, so that when a quantity unit that is not less than the payment file price is received in an issuer blockchain address, the data file is capable of being determined from the data content of the payment file price, and the payment attribute includes: a payment file type, an issuer blockchain address, and a payment file price. The blockchain can be a block DAG technology, etc., and the payment file price is calculated according to a local digital legal currency. For those not needed to exchange legal currency, they can be blockchain points or blockchain assets. The payment file type can indicate which payment method is adopted, and can also indicate the operation method for the data content of the payment file.

Step S602: A check code of the data content of the payment file is calculated. The check code of the data content of the payment file is a digital feature identifier of the data content of the payment file calculated through a one-way function.

Step S603: A blockchain signature message Message of the issuer blockchain address is generated according to the issuer blockchain address Issue and the check code of the data content of the payment file CRC, where Message=signmessage(Issue, CRC).

Step S604: A payment file tag is generated according to the payment attribute, the check code of the data content of the payment file, and the blockchain signature message.

Step S605: The payment file tag and the data content of the payment file are merged to generate a payment file, with reference to FIG. 3.

The payment file can include an XML file, a JSON file, a binary file, a text file, an Office file, a network disk link file and other formats.

In this embodiment, the check code of the data content of the payment file is configured to verify the identification data file, and the blockchain signature containing this check code is performed through the issuer blockchain address, thus ensuring that the issuer of the digital file can confirm the ownership of the digital file and can package and issue the digital file directly.

Further, the method previously includes: it is confirmed that the issuer blockchain address is not in a blacklist.

Furthermore, the one-way function includes: MD5, SHA-224, SHA-256, SHA-384, SHA-512, SHA-512/224, SHA-512/256, SHA3-224, SHA3-256, SHA3-384, SHA3-512 functions.

Furthermore, the payment attribute further includes: a random code, configured to generate a TOTP key. In this embodiment, the issuer can use the random code associated with the TOTP password to control the dissemination range of the payment file.

Furthermore, the payment attribute further includes: a product attribute, including an origin, a producer, a purpose, performance, a specification, a grade, main ingredients, a production date, a validity period, an inspection certificate, an instruction for use, and an after-sales service of the data file, or the content, specification or cost of the service. In this embodiment, the issuer can embed product attribute and perform signing to meet the requirements of digital file consumption regulations in various regions. When a consumer dispute occurs, the consumer can take further steps according to the signed product attribute because he/she holds the issuer's signature.

Furthermore, the generating the blockchain signature message of the issuer blockchain address according to the issuer blockchain address and the check code of the data content of the payment file includes: a blockchain signature message of the issuer blockchain address is generated according to the issuer blockchain address, the payment attribute, and the check code of the data content of the payment file.

Furthermore, the determining the data content of the payment file according to the payment attribute and the data file includes:

The data file is encrypted and merged into a new data file according to the issuer blockchain address; and The data content of the payment file is determined according to the payment attribute and the new data file.

Furthermore, the determining the data content of the payment file according to the payment attribute and the data file includes:

The data file is split into 2 parts according to the payment attribute: an unchanged portion of the data file and a portion of the newly encrypted data file; and The data content of the payment file is determined according to the payment attribute, the unchanged portion of the data file, and the portion of the newly encrypted data file. In this embodiment, the payment file supports audition preview and other requirements.

Further, the data files include: one file, multiple files or all files in a folder.

Furthermore, the payment attribute further includes: the blockchain address of the data file and the private key of the blockchain address of the data file.

Furthermore, the payment attribute further includes: a payment file check website, a check code of the payment file, and a payment file check server website. The payment file check server website is configured to encrypt and decrypt the data content of the payment file. The payment file check code is used when accessing the payment file check website or the payment file check server website.

Furthermore, the payment attribute further includes: the issuer share, the rights owner blockchain address, and the rights owner share. In this embodiment, the copyright owner or issuer can determine the shares owned by the data file issuer, the copyright owner, the patentee, etc. when issuing the payment file, automatically collect payments, reduce the mutual settlement process, achieve efficient circulation, and improve the efficiency of knowledge creation.

Furthermore, the determining the data content of the payment file according to the payment attribute and the data file includes:

The payment attribute further includes: an encryption algorithm identifier of the data content of the payment file; and The data file is encrypted according to the encryption algorithm identifier of the data content of the payment file to obtain the data content of the payment file.

Embodiment 7

Figure 4:
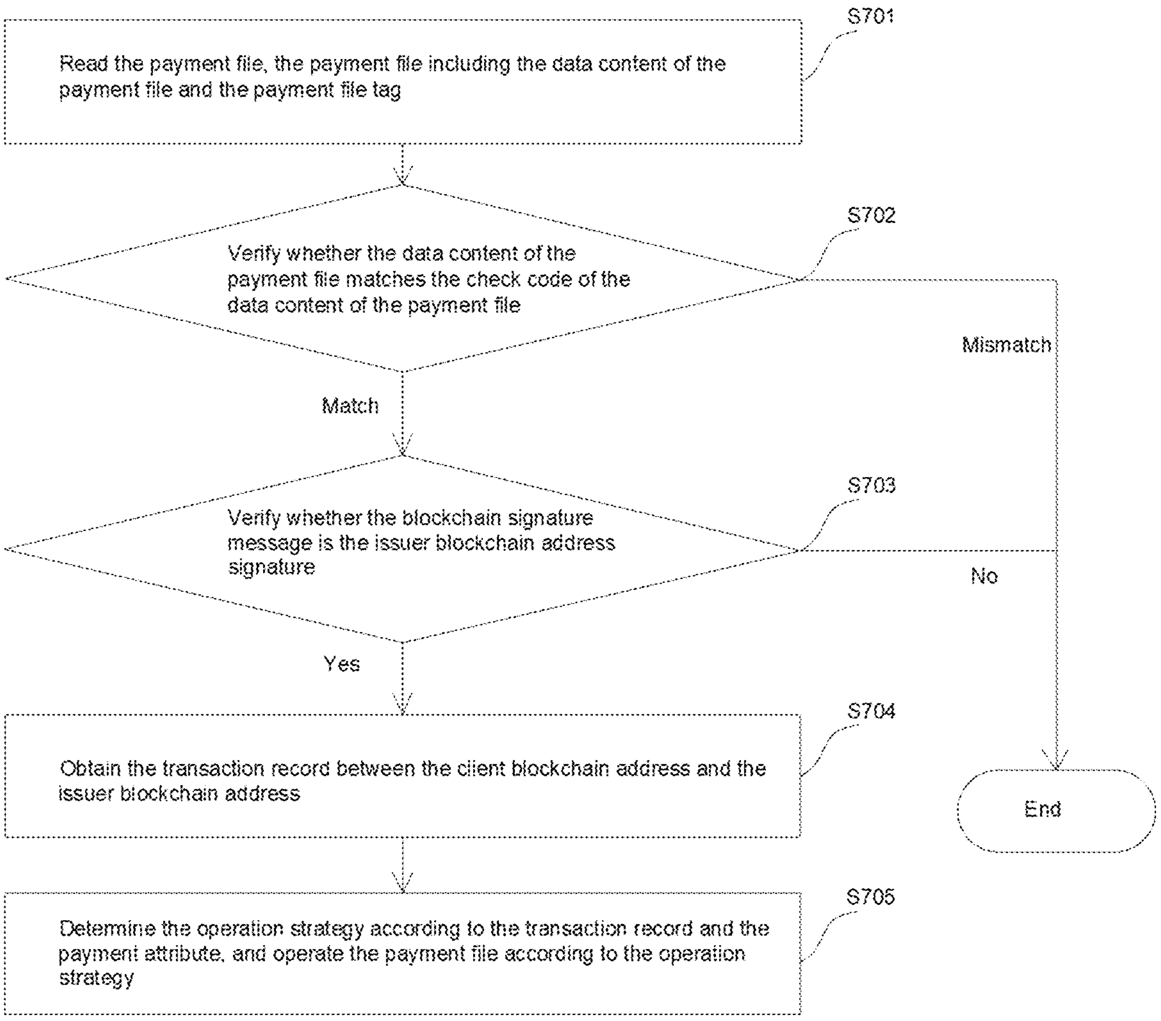
FIG. 4 is a flow chart of an embodiment 7 of the present disclosure.
Figure 5:
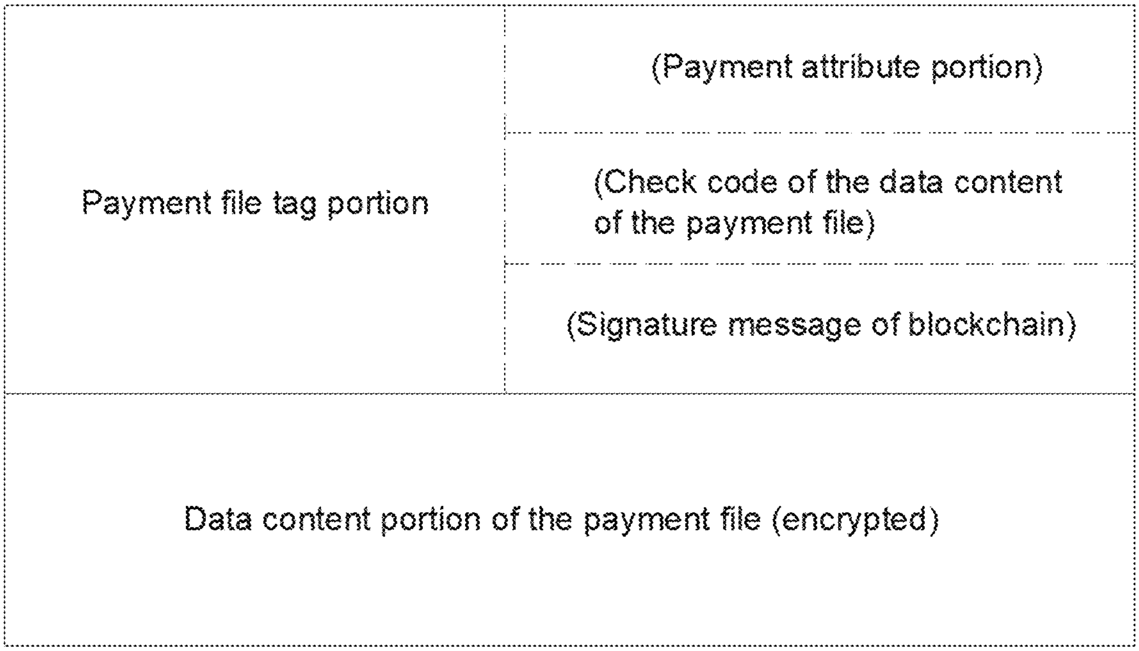
FIG. 5 is a schematic structural view of a payment file according to an embodiment of the present disclosure.

Embodiment 7 of the present disclosure discloses a method for generating and reading a payment file. Referring to FIG. 4, it is used for a reading device. The method includes:

Step S701: The payment file is read, the payment file including: a data content of the payment file and a payment file tag; the data content of the payment file includes a data file, and the payment file tag includes a payment attribute, a check code of the data content of the payment file, and a blockchain signature message. The payment attribute includes: a payment file type, an issuer blockchain address, and a payment file price; the check code of the data content of the payment file is a digital feature identifier that calculates the data content of the payment file through a one-way function, and the blockchain signature message is generated in the issuer blockchain address through the blockchain signature according to the check code of the data content of the payment file.

Step S702: Whether the data content of the payment file matches the check code of the data content of the payment file is verified.

Step S703: Whether the blockchain signature message is issuer blockchain address signature is verified according to the issuer blockchain address, the check code of the data content of the payment file, and blockchain signature message in response to the data content of the payment file matching the check code of the data content of the payment file.

Step S704: The transaction record between the client-associated blockchain address and the issuer blockchain address is obtained upon receiving the unit of account that is sent from the client-associated blockchain address and not less than the payment file price in the issuer blockchain address in response to the blockchain signature message being the issuer blockchain address signature.

Step S705: An operation strategy for the payment file is determined according to the transaction record and the payment attribute, such that the data file is capable of being determined from the data content of the payment file, and the payment file is performed according to the operation strategy.

In this embodiment, when the user receives the payment file, he/she can verify the integrity of the data file and the identity of the issuer, and can directly pay the issuer to obtain the data file from the payment file, realizing low-cost point-to-point issuance and reception of copyright files.

Further, after reading the payment file, the method further includes: it is confirmed that the issuer blockchain address is not in a blacklist.

Furthermore, the one-way function includes: MD5, SHA-224, SHA-256, SHA-384, SHA-512, SHA-512/224, SHA-512/256, SHA3-224, SHA3-256, SHA3-384, and SHA3-512 functions.

Further, the method further includes:

The payment attribute further includes: a random code, the random code being configured to generate a TOTP secret key;

A TOTP dynamic verification code, and whether a right to access the data content of the payment file is existing is verified according to the TOTP dynamic verification code and the random code. If the TOTP verification code is inconsistent, then it exits and there is no right to operate the payment file.

The specific TOTP verification code process here is as follows: a server dynamic password generated according to secrete key information of the payment file is inquired from a server according to a secrete key index number, identity information of the reading device and the like, the secrete key information of the payment file is read, a local dynamic password is generated according to the secrete key information, and if the server dynamic password is included in the local dynamic password of the reading device, the operation authority of the reading device for the payment file is determined.

Further, the payment attribute further includes: a product attribute, including an origin, a producer, a purpose, performance, a specification, a grade, main ingredients, a production date, a validity period, an inspection certificate, an instruction for use, an after-sales service of the data file, or a content, a specification, and a cost of a service.

Further, the verifying whether the blockchain signature message is the issuer blockchain address signature according to the issuer blockchain address, the check code of the data content of the payment file, and the blockchain signature message includes: whether the blockchain signature message is the issuer blockchain address signature is verified according to the issuer blockchain address, the payment attribute, the check code of the data content of the payment file, and the blockchain signature message.

Further, the client-associated blockchain address includes: one or more client blockchain addresses, a proxy blockchain address to which the client has been connected, and a client default blockchain address with an identified ownership. In this embodiment, the payment file supports client-associated blockchain address joint payment.

Further, the proxy blockchain address to which the client has been connected includes: a proxy blockchain address where the client has been connected via a Web, and a proxy blockchain address where the client has been connected via a Socket.

Further, the client default blockchain address with the identified ownership includes: a blockchain address mapped to the logged-in blockchain mailbox.

Further, the obtaining the transaction record between the client-associated blockchain address and the issuer blockchain address includes:

A balance of the client-associated blockchain address is obtained;

An accounting amount of the payment file price is transferred from the client-associated blockchain address to the issuer blockchain address in response to the balance being greater than the payment file price; and A number of transaction confirmations between the client-associated blockchain address and the issuer blockchain address is obtained.

In this embodiment, small-amount lightning payments can be supported through process integration to improve the consumption experience of the user.

Further, the method further includes: the transaction record between the client-associated blockchain address and the issuer blockchain address is obtained when the transaction confirmation number meets the blockchain confirmation requirements.

Further, the determining the operation strategy for the payment file according to the transaction record and the payment attribute to determine the data file from the data content of the payment file, and the operating the payment file according to the operation strategy include: The data file is obtained from the data content of the payment file according to the operation strategy in response to judging that the unit of account that is sent from the client-associated blockchain address and not less than the payment file price is received in the issuer blockchain address within a preset time period according to the transaction record.

Further, the preset time period may be: 1 minute, 5 minutes, 10 minutes, 20 minutes, which is specifically depending on the network characteristics of the blockchain.

Furthermore, the determining the operation strategy for the payment file according to the transaction record and the payment attribute to determine the data file from the data content of the payment file, and the operating the payment file according to the operation strategy include:

The data content of the payment file includes a multimedia data file; the multimedia data file includes mp3, mp4 files, etc.; and The data content of the payment file is played in response to judging that the unit of account that is sent from the client-associated blockchain address and not less than the payment file price is received in the issuer blockchain address within a preset time period according to the transaction record.

In this embodiment, the payment file can support an mp3 implementation payment playback terminal.

Further, the determining the operation strategy for the payment file according to the transaction record and the payment attribute to determine the data file from the data content of the payment file, and the operating the payment file according to the operation strategy include:

The data content of the payment file includes a compressed data file;

The data content of the payment file is decompressed in response to judging that the unit of account that is sent from the client-associated blockchain address and not less than the payment file price is received in the issuer blockchain address within a preset time period according to the transaction record.

In this embodiment, the payment file may support file/folder compression and merging.

Further, the determining the operation strategy for the payment file according to the transaction record and the payment attribute to determine the data file from the data content of the payment file, and the operating the payment file according to the operation strategy include:

The data content of the payment file includes an executable data file;

An authorization record to a local system is generated according to the transaction record in response to judging that the unit of account that is sent from the client-associated blockchain address and not less than the payment file price is received in the issuer blockchain address within a preset time period according to the transaction record, such that when being run next time, the data file can be executed in an authorized manner according to the authorization record.

In this embodiment, the payment file supports software copyright verification.

Further, the method further includes:

The payment attribute further includes: a blockchain address of the data file, and a private key of the blockchain address of the data file;

The client-associated blockchain address is the blockchain address of the data file; and In response to the balance of the blockchain address of the data file being not less than the accounting unit of the payment file price or in response to the accounting unit of not less than the payment file price being received in the blockchain address of the data file within a preset time period;

the unit of account for paying the file price is transferred from the blockchain address of the data file to the issuer blockchain address according to the private key of the blockchain address of the data file.

Further, the payment attribute further includes: a payment file check website, a payment file check code, and a payment file check server website. The payment file check server website is configured to encrypt and decrypt the data content of the payment file.

Further, the payment attribute further includes: an issuer share, a rights owner blockchain address, and a rights owner share.

Further, when the unit of account that is not less than the payment file price is received from the client-associated blockchain address in the issuer blockchain address, the obtaining the transaction record between the client-associated blockchain address and the issuer blockchain address includes:

the transaction records among the client-associated blockchain address, the issuer blockchain address, and the rights owner blockchain address are obtained upon receiving the unit of account that is sent from the client-associated blockchain address, not less than the payment file price and calculated respectively according to the issuer share and the rights owner share in the issuer blockchain address and the rights owner blockchain address.

Further, the method further includes:

The unit of account that is calculated according to the issuer share and not less than the payment file price is paid to the issuer blockchain address from the client-associated blockchain address, and the unit of account that is calculated according to the rights owner share and not less than the payment file price is paid to the rights owner blockchain address from the client-associated blockchain address.

Further, the determining the operation strategy for the payment file according to the transaction record and the payment attribute to determine the data file from the data content of the payment file, and the operating the payment file according to the operation strategy include: when it is judged that the unit of account that is sent from the client-associated blockchain address, not less than the payment file price, and calculated according to the issuer share and the rights owner share is received respectively in the issuer blockchain address and the rights owner blockchain address according to the transaction record, an authorization record to a local system is generated according to the transaction record, so that the data file is obtained from the data content of the payment file according to the operation strategy.

In this implementation, with respect to the 123.mp3.pay payment file to be read, the typical process is as follows:

1. The blockchain payment attribute tag of the 123.mp3.pay file is read. The payment price is 1 yuan or 1 point, and the issuer blockchain address is: NVVGGHZIQUZauj.
2. Whether the check code of the data content of the payment file of 123.mp3.pay is valid is verified.
3. If the check code in the previous step is valid, then whether the signature message of 123.mp3.pay is signed by NVVGGHZIQUZauj is verified.
4. If the signature message in the previous step is valid, then the issuer blockchain address and the seller (or rights owner) blockchain address are in the blacklist is verified.
5. If the issuer blockchain address and the seller blockchain address are not included in the blacklist in the previous step, then it will display waiting for the user to enter the TOTP password. If the password is correct, then payment will be made according to corresponding shares (the accumulative sum thereof is payment price 1 yuan).
6. The above payment transaction record is record, and if the transaction is successful, the 123.mp3 file is then extracted.

Further, the determining the operation strategy for the payment file according to the transaction record and the payment attribute to determine the data file from the data content of the payment file, and the operating the payment file according to the operation strategy include:

The data content of the payment file includes a multimedia data file; and

The data content of the payment file is played in response to judging that the unit of account that is sent from the client-associated blockchain address, not less than the payment file price, and calculated according to the issuer share and the rights owner share is received respectively in the issuer blockchain address and the rights owner blockchain address according to the transaction record.

Further, the determining the operation strategy for the payment file according to the transaction record and the payment attribute to determine the data file from the data content of the payment file, and the operating the payment file according to the operation strategy include:

The data content of the payment file includes a compressed data file; and

The data content of the payment file is decompressed in response to judging that the unit of account that is sent from the client-associated blockchain address, not less than the payment file price, and calculated according to the issuer share and the rights owner share is received respectively in the issuer blockchain address and the rights owner blockchain address according to the transaction record.

Further, the determining the operation strategy for the payment file according to the transaction record and the payment attribute to determine the data file from the data content of the payment file, and the operating the payment file according to the operation strategy include:

The data content of the payment file includes an executable data file; and

The authorization record for the local system is generated according to the transaction record in response to judging that the unit of account that is sent from the client-associated blockchain address, not less than the payment file price, and calculated according to the issuer share and the rights owner share is received respectively in the issuer blockchain address and the rights owner blockchain address according to the transaction record, such that when being run next time, the data file can be directly executed in an authorized manner according to the authorization record.

Further, the determining the operation strategy for the payment file according to the transaction record and the payment attribute to determine the data file from the data content of the payment file, and the operating the payment file according to the operation strategy include:

The payment attribute further includes: an encryption algorithm identifier of the data content of the payment file;

The data content of the payment file is decrypted according to the encryption algorithm identifier of the data content of the payment file; and The data file is obtained from the decrypted data content of the payment file. In this embodiment, the payment file supports data file encryption Embodiment 8

Embodiment 8 of the present disclosure discloses a system for generating and a reading payment file, used for a generation device. The generation device includes: a payment file tag unit, a verification unit, and an operation unit; the payment file tag unit, the verification unit, and the operation unit are logically connected to each other;

The payment file tag unit is configured to determine a payment attribute, the payment attribute including: a payment file type, an issuer blockchain address, and a data file price; and to generate a payment file tag according to the payment attribute, a check code of the data content of the payment file, and a blockchain signature message;

A verification unit is configured to calculate the check code of the data content of the payment file, where the check code of the data content of the payment file is a digital feature identifier that calculates the data content of the payment file through a one-way function; and to generate a blockchain signature message of the issuer blockchain address according to the issuer blockchain address and the check code of the data content of the payment file; and The operation unit is configured to determine the data content of the payment file according to the payment attribute and the data file, so that when a quantity unit that not less than the price of the payment file is received in the issuer blockchain address, the payment file can be determined from the data content of the payment file for merging the payment file tag and the data content of the payment file to generate a payment file.

Embodiment 9

Embodiment 9 of the present disclosure discloses a system for generating and reading a payment file, used for a reading device. The reading device includes: a file reading unit, a verification unit, and an operation unit; the file reading unit, the verification unit, and the operation unit are logically connected to each other;

The file reading unit is configured to read a payment file, the payment file including: a data content of the payment file and a payment file tag; the data content of the payment file includes a data file, and the payment file tag includes a payment attribute, a check code of the data content of the payment file, and a blockchain signature message; the payment attribute includes: a payment file type, an issuer blockchain address, and a payment file price; the check code of the data content of the payment file is a digital feature identifier that calculates the data content of the payment file through a one-way function, and the blockchain signature message is generated through the blockchain signal according to the check code of the data content of the payment file in the issuer blockchain address;

The verification unit is configured to verify whether the data content of the payment file matches the data content of the payment file check code; if the data content of the payment file matches the data content of the payment file check code, whether the blockchain signature message is the issuer blockchain address signature is verified according to the issuer blockchain address, the check code of the data content of the payment file, and the blockchain signature message; and The operation unit is configured to, if the blockchain signature message is the issuer blockchain address signature, when the unit of account that is sent from the client-associated blockchain address and not less than the payment file price is received in the issuer blockchain address, obtain the transaction record between the client-associated blockchain address and the issuer blockchain address; and to determine an operation strategy for the payment file according to the transaction record and the payment attribute, so as to determine the data file from the data content of the payment file, and to operate the payment file according to the operation strategy.

Embodiment 10

Embodiment 10 of the present disclosure discloses a non-transitory computer-readable storage medium having a computer program stored therein. When executed by a processor, the computer program implements steps of any one method for generating and reading a payment file described above. A storage medium can include a high-speed random access storage medium, and can further include a non-volatile storage medium, such as a hard drive, a memory, a plug-in hard drive, a smart memory cards (SMC), and a secure digital (SD) card, a Flash Card, at least one disk storage medium, a flash memory device, or other volatile solid-state storage medium, etc.

In the present disclosure, the invention determines the data content of the payment file according to the payment attribute and the data file, calculates the check code of the data content of the payment file, generates the blockchain signature message of the issuer blockchain address according to the issuer blockchain address and the check code of the data content of the payment file, generates the payment file tag according to the payment attribute, the check code of the data content of the payment file, and the blockchain signature message, and merges the payment tag, and the data content of the payment file to generate the payment file.

By inventing payment files and supporting dual verification technologies such as the check code of the data content of the payment file and the blockchain signature message, the present disclosure can effectively verify the issuer's ownership of the data file and further ensures that the data file is temper-proof, thereby improving the consumption experience of the user on the direct-release digital files.

In the present disclosure, the payment file is read, the payment file including: the data content of the payment file and the payment file tag; if the data content of the payment file matches the check code of the data content of the payment file, if it is verified that the blockchain signature message is the issuer blockchain address signature according to the issuer block chain address, the check code of the data content of the payment film, and the blockchain signal message, when the unit of account that is sent from the client-associated blockchain address and not less than the payment file price is received in the issuer blockchain address, the operation for the payment file is determined according to the transaction record and the payment attribute. The present disclosure solves the problem of users' trust in the source of the payment file through the blockchain double verification technology, thereby improving the consumption experience of the user on the direct-release digital files.

Those skilled in the art can clearly understand that for the convenience and simplicity of description, the above-described units are only exemplified by the division of the above-mentioned functional modules. In actual applications, the above-mentioned functions can be allocated to different modules according to needs. Functional modules are completed, that is, the internal structure of the device is divided into different functional modules to complete all or part of the functions described above. For the specific working processes of the systems, devices and units described above, reference can be made to the corresponding processes in the foregoing method embodiments, and details will not be described again here.

In the several embodiments provided in this application, it should be appreciated that the disclosed systems, devices, and methods can be implemented in other ways. For example, the device embodiments described above are only illustrative. For example, the division of modules or units is only a logical function division. In actual implementation, there may be other division methods, for example, multiple units or components may either be combined with or integrated into another system, or some features can be ignored, or not implemented. On the other hand, the coupling or direct coupling or communication connection between each other shown or discussed may be through some interfaces, and the indirect coupling or communication connection of the devices or units may be in electrical, mechanical or other forms.

The units described as separate components may or may not be physically separated, and the components shown as units may or may not be physical units, that is, they may be located in one place, or they may be distributed to multiple network units. Some or all of the units can be selected according to actual needs to achieve the purpose of the solution of this embodiment.

In addition, each functional unit in various embodiments of the present disclosure can be integrated into one processing unit, or each unit can exist physically alone, or two or more units can be integrated into one unit. The above integrated units can be implemented in the form of hardware or software functional units.

If the integrated unit is implemented in the form of a software functional unit and sold or used as an independent product, it may be stored in a computer-readable storage medium. Based on this understanding, essentially, the technical solution of the present disclosure or part of the technical solution contributing to the existing technology or all or part of the technical solution can be embodied in the form of a software product, and the computer software product is stored in a storage medium, including several instructions to cause a computer device (which may be a personal computer, a server, or a network device, etc.) or a processor to execute all or part of the steps of the methods described in various embodiments of the present disclosure. The above-mentioned storage medium includes: a U disk, a mobile hard disk, a read-only memory (ROM), a random access memory (RAM), a magnetic disk or an optical disk and other media that can store a program code.

The above are merely specific embodiments of the present disclosure, but the protection scope of the present disclosure is not limited thereto. Variations or substitutions easily contemplated by any person familiar with the technical field within the technical scope disclosed by the present disclosure shall be included in the protection scope of the present disclosure. Therefore, the protection scope of the present disclosure shall subject to the protection scope of the claims.

The invention claimed is:

1. A method for reading a payment file, used for a reading device, wherein the method is executed by a processor of the reading device, the method comprising:

reading a directly issued payment file, wherein:

the payment file comprises a data content of the payment file and a payment file tag; the payment file tag comprises payment attributes, a check code of the data content of the payment file, and a blockchain signature message;

the payment attributes comprise an issuer blockchain address, a payment file price, an issuer share, a rights owner blockchain address, and a rights owner share;

verifying whether the data content of the payment file matches the check code of the data content of the payment file; wherein the check code of the data content of the payment file is a digital feature identifier calculated from the data content of the payment file through a one-way function;

verifying whether the blockchain signature message is the issuer blockchain address signature according to the issuer blockchain address, the check code of the data content of the payment file, and the blockchain signature message in response to the data content of the payment file matching the check code of the data content of the payment file;

directly transferring an accounting amount of the payment file price from a client-associated blockchain address, through a blockchain network to the issuer blockchain address according to the issuer share, and to the rights owner blockchain address according to the rights owner share; wherein the client-associated blockchain address comprises one client blockchain address, the client blockchain address is a blockchain address of the reading device, and the payment is made by the reading device;

obtaining transaction records among the client-associated blockchain address, the issuer blockchain address, and the rights owner blockchain address in response to the blockchain signature message corresponding to the issuer blockchain address;

determining an operation authority for the payment file according to the transaction records and the payment attributes; wherein a data file is capable of being determined from the data content of the payment file;

operating the payment file according to the operation authority;

wherein the determining the operation authority for the payment file according to the transaction records and the payment attributes and the operating the payment file according to the operation authority comprises:

determining the operation authority for the payment file according to the transaction records and the payment attributes;

wherein the reading device verifies that the unit of account, sent from the client-associated blockchain address through multiple direct transactions to the issuer blockchain address and the rights owner blockchain address respectively, is not less than the payment file price and is calculated according to the issuer share and the rights owner share, and has been received in the issuer blockchain address and the rights owner blockchain address;

the payment attributes further comprise an encryption algorithm identifier of the data file;

decrypting the data content of the payment file according to the payment attributes and the encryption algorithm identifier of the data file; and saving the decrypted data content of the payment file as the data file.

2. The method according to claim 1, wherein the determining the operation authority for the payment file according to the transaction records and the payment attributes and the operating the payment file according to the operation authority comprises: determining whether the payment file is authorized to be run from a current system according to the transaction records; and generating an authorization record for a local system according to the transaction records in response to the payment file having been authorized to be run from the current system, wherein, when next time the payment file is run, the payment file is capable of being run directly in an authorized manner according to the authorization record.

3. The method according to claim 1, wherein the method further comprises: the payment attributes further comprising a blockchain address of the data file and a private key of the blockchain address of the data file; the client blockchain address being the blockchain address of the data file; paying the payment file price to the blockchain address of the data file; and transferring a balance of the payment file price from the blockchain address of the data file to the issuer blockchain address according to the private key of the blockchain address of the data file.

4. The method according to claim 1, wherein the method further comprises: the payment attributes further comprising a random code, the random code being configured to generate a TOTP (Time-based One-Time Password) algorithm secret key; and obtaining a TOTP algorithm dynamic verification code; and verifying whether a right to access the data content of the payment file is existing according to the TOTP algorithm dynamic verification code and the random code.

5. A non-transitory computer-readable storage medium, having a computer program stored therein, when executed by a processor, causes the processor to perform the method according to claim 1.

6. The method according to claim 1, wherein the determining the operation authority for the payment file according to the transaction records and the payment attributes and the operating the payment file according to the operation authority comprises: the data content of the payment file comprising a multimedia data file; playing the data content of the payment file.

7. The method according to claim 1, wherein the data content of the payment file comprises a compressed data file.

8. The method according to claim 1, wherein the one-way function is selected from a group consisting of: MD5, SHA-224, SHA-256, SHA-384, SHA-5 12, SHA-512/224, SHA-512/256, SHA3-224, SHA3-256, SHA3-384, and SHA3-512.

* * * * *